(12) United States Patent
Fix et al.

(10) Patent No.: US 7,139,421 B1
(45) Date of Patent: *Nov. 21, 2006

(54) METHODS AND APPARATUSES FOR DETECTING SIMILAR FEATURES WITHIN AN IMAGE

(75) Inventors: Raymond Fix, Natick, MA (US); Ivan Bachelder, Newton, MA (US)

(73) Assignee: Cognex Corporation, Natick, MA (US)

( * ) Notice: Subject to any disclaimer, the term of this patent is extended or adjusted under 35 U.S.C. 154(b) by 1122 days.

This patent is subject to a terminal disclaimer.

(21) Appl. No.: 09/605,247

(22) Filed: Jun. 28, 2000

Related U.S. Application Data (60) Provisional application No. 60/141,442, filed on Jun. 29, 1999.

(51) Int. Cl.
*G06K 9/00* (2006.01)
(52) U.S. Cl. .................. 382/141; 382/150; 382/195; 382/203; 382/217
(58) Field of Classification Search ............ 382/141, 382/145, 147, 149, 146, 150, 151, 152, 154, 382/206, 286, 291, 190, 199, 195, 203, 217; 250/306; 348/87, 94, 95, 126; 356/388, 356/395
See application file for complete search history.

(56) References Cited

U.S. PATENT DOCUMENTS

| 5,371,690 | A | * | 12/1994 | Engel et al. ............... 382/141 |
| 5,694,482 | A | * | 12/1997 | Maali et al. ................ 382/151 |
| 5,815,275 | A | * | 9/1998 | Svetkoff et al. ............ 356/608 |
| 6,075,881 | A | * | 6/2000 | Foster et al. ............... 382/141 |
| 6,078,700 | A | * | 6/2000 | Sarachik .................... 382/190 |
| 6,614,926 | B1 | * | 9/2003 | Fix et al. .................... 382/150 |

* cited by examiner

*Primary Examiner*—Sheela Chawan
(74) *Attorney, Agent, or Firm*—Tracy M. Calabresi (57) ABSTRACT

The invention provides methods and apparatuses for finding features that are similar in the image. The invention finds the similar features by searching portions of the image for features that are substantially similar to a feature prototype. First, individual features in the image are located and designated candidate features, and optionally a spatial pattern representing a majority of the candidate features is generated. Next, feature profiles are generated therefrom, and the feature prototype is constructed using at least a subset of feature profiles. An example is described wherein the object is a ball grid array, the similar features are the solder balls on the ball grid array, the feature profiles are local images of balls of a ball grid array, and the feature prototype is an average of a sub-set of the local images of the balls.

44 Claims, 7 Drawing Sheets

METHODS AND APPARATUSES FOR DETECTING SIMILAR FEATURES WITHIN AN IMAGE

This application claims the benefit of U.S. Provisional Application No. 60/141,442, filed Jun. 29, 1999.

FIELD

This invention relates to machine vision, and particularly to methods and apparatuses for feature detection.

BACKGROUND

Many machine vision applications use geometrical descriptions as canonical models for inspecting or aligning an object within an image. A geometrical description is a collection of data that specifies the basic geometry of the object, that is the location of object features and dimensions of the object features relative to each other, where the object features might include the object body, number of balls in a ball grid array, and the presence or absence of balls in a ball grid array, for example. A ball grid array is a surface-mount device consisting of a more-or-less rectangular package and a grid of balls. A geometrical-based model for a ball grid array typically consists of a grid spacing in two dimensions (x and y); a nominal, a minimum, and a maximum dimension of the balls in the grid; the presence or absence of balls at each of the grid points; and an origin location.

The machine-vision system can use a geometrical model to locate an instance of an object in an image and align the object in the proper orientation (i.e., register the object). Often, one or more balls are purposely missing to indicate the correct orientation of the ball grid array. For example, a vision-based automatic surface mounter (SMD) machine typically employs a geometrical-based model of a ball grid array to place the ball grid array on a printed circuit board by aligning, in the proper orientation, the balls with pads on the printed circuit board.

The process of creating accurate geometrical models of objects, either by manually measuring the dimensions of the object, or by extracting the dimensions from manufacturing specifications, can be very tedious, especially when the objects are complicated.

In many ball grid array applications, further problems exist because it is difficult to identify the balls in images because of lighting effects. The balls often image poorly because the metal balls specularly reflect the light of the imaging system, and, thus, image less accurately. Also, the three-dimensional shape of the balls causes shadowing, which obscures the balls in the images. The three-dimensional shape also causes stronger reflections from some portions of the balls more than from other portions. Additionally, cheaper light and optic systems or light and optic systems that are focused to image an aspect of the production other than identifying balls decrease the quality of the ball images. Each of these lighting effects contributes to poor quality ball images and often frustrates identification of the balls in images.

Figure 1:
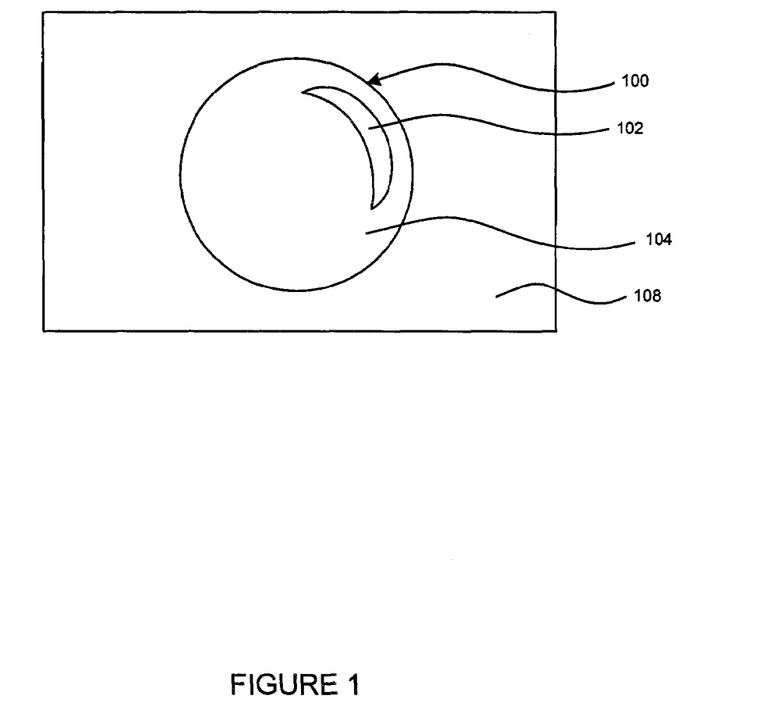
FIG. 1 illustrates an example of the reflectivity of a ball exhibiting specular reflection.

Several known machine-vision techniques are used to identify balls. One technique uses search tools, such as normalized correlation with a synthetic circular model, where normalized correlation searching is known in the art and described at B. K. D. Horn, "Robot Vision", MIT Press, London England, 1985, Section 6.1.2, pp. 129–132. This technique often misses balls because of lighting effects. For example, FIG. 1 illustrates an instance of the reflectivity of a ball 100 against a background 108. The reflected light from the ball 100 forms two distinct regions, a brighter region, region 102, and a darker region, region 104. The search tool is searching the image for a match to the synthetic circular model. No single region 102, 104, or 108 is circular because of the lighting effects. Therefore, no single region matches the model well. Typically, the correlation search tool fails to realize that region 102 and 104 are part of the same object. Thus, the search tool often misses the ball 100 or, at the very least, generates a low correlation score for the ball 100 (i.e., indicates a low probability that the feature in the image is circular).

Another known technique to find balls is blob analysis, where blob analysis is also commonly called region analysis. Blob analysis segments foreground objects from background objects by the grey values of the foreground and the background pixels in the image. As is known in the art, it is often difficult to choose a threshold grey value between the foreground and the background. Even when features image well, a good threshold grey value can segment extraneous features. Choosing the correct threshold grey value is even more difficult for poor quality ball images. Consequently, blob analysis of poor quality ball images also often fails to segment enough balls to be useful in many applications.

Many applications can use the above techniques only if the application incorporates an expensive lighting system. The expensive lighting system can make the imaged balls appear roughly circular and/or annular, and, therefore, match well enough against the expected model, thereby making blob analysis useful. However, in some applications an expensive lighting system may not be desirable.

SUMMARY

The invention provides methods and apparatuses for finding features that are similar in the image. The invention finds the similar features by searching portions of the image for features that are substantially similar to a feature prototype.

The feature prototype is generated using candidate features within the image. Specifically, the candidate features are found in the image, feature profiles are generated therefrom, and the feature prototype is constructed using at least a subset of feature profiles. In one embodiment, the feature profiles are local images of balls of a ball grid array, and the feature prototype is an average of a subset of the local images of the balls.

One of the reasons the invention is robust is because the invention uses a feature prototype that is generated from the image to find the other features. Because the feature prototype is generated from the image, the feature prototype exhibits at least some of the same lighting effects as the features. Therefore, the lighting effects are less likely to frustrate the identification of the similar features. Thus, less expensive lighting systems can be employed.

In one embodiment, the subset of feature profiles creating the feature prototype are only the "best" feature profiles. The "best" feature profiles are ones representing the candidate features positioned near pattern-position points, where pattern-position points are given by a pattern that is generated as described below.

In one embodiment, a spatial pattern within the image is used to focus the search for similar features. More particularly, the search is conducted in neighborhoods of the image as directed by the pattern-position points of the spatial pattern. The spatial pattern is a pattern formed by a majority of the candidate features, and the pattern contains the pattern-position points. For instance, the pattern of an image of a ball grid array is the grid and specifics about the grid, while the pattern-positions are the intersections of the gridlines. The pattern is determined by: grouping at least a portion of the candidate balls into first sets of approximately collinear candidate balls, each of the first sets representing a first line, the first lines being substantially parallel to one another; grouping at least a portion of the candidate balls into second sets of approximately collinear candidate balls, each of the second sets representing a second line, the second lines being substantially parallel to one another and substantially orthogonal to the first lines; and determining the pattern formed by the first lines and the second lines. In one embodiment, the pattern includes the located gridlines and a patterned or uniform pitch or pitches between the located gridlines. The pattern can also include other information such as the origin and a grid angle of the located gridlines, where the grid angle is information that is implicit from the gridline.

One of the advantages of the invention is that it is less sensitive to poor lighting. Thus, an application of the invention remains robust while using less expensive lighting systems. The invention can also more easily find specularly reflecting features that image inconsistently. Further, the invention can identify features having aspects that are similar other than just one aspect, such as shape. Thus, the invention has uncanny accuracy, and therefore, the invention typically does not designate dissimilar features as similar.

In further aspects, the invention can be used to find features of a specified-feature type in an image. Portions of the image are compared to the feature prototype to verify whether the portions of the image contain one of the features of the specified-feature type, such as a ball.

In further aspects, the invention provides an apparatus in accord with the methods described above. The aforementioned and other aspects of the invention are evident in the drawings and in the description that follows.

BRIEF DESCRIPTION OF DRAWINGS

The invention will be more fully understood from the following detailed description, in conjunction with the accompanying figures, wherein:

FIGS. 4a–4i depict an application of the operation of FIG. 3 applied to one instance of a ball grid array;

DETAILED DESCRIPTION OF THE DRAWINGS

Figure 2:
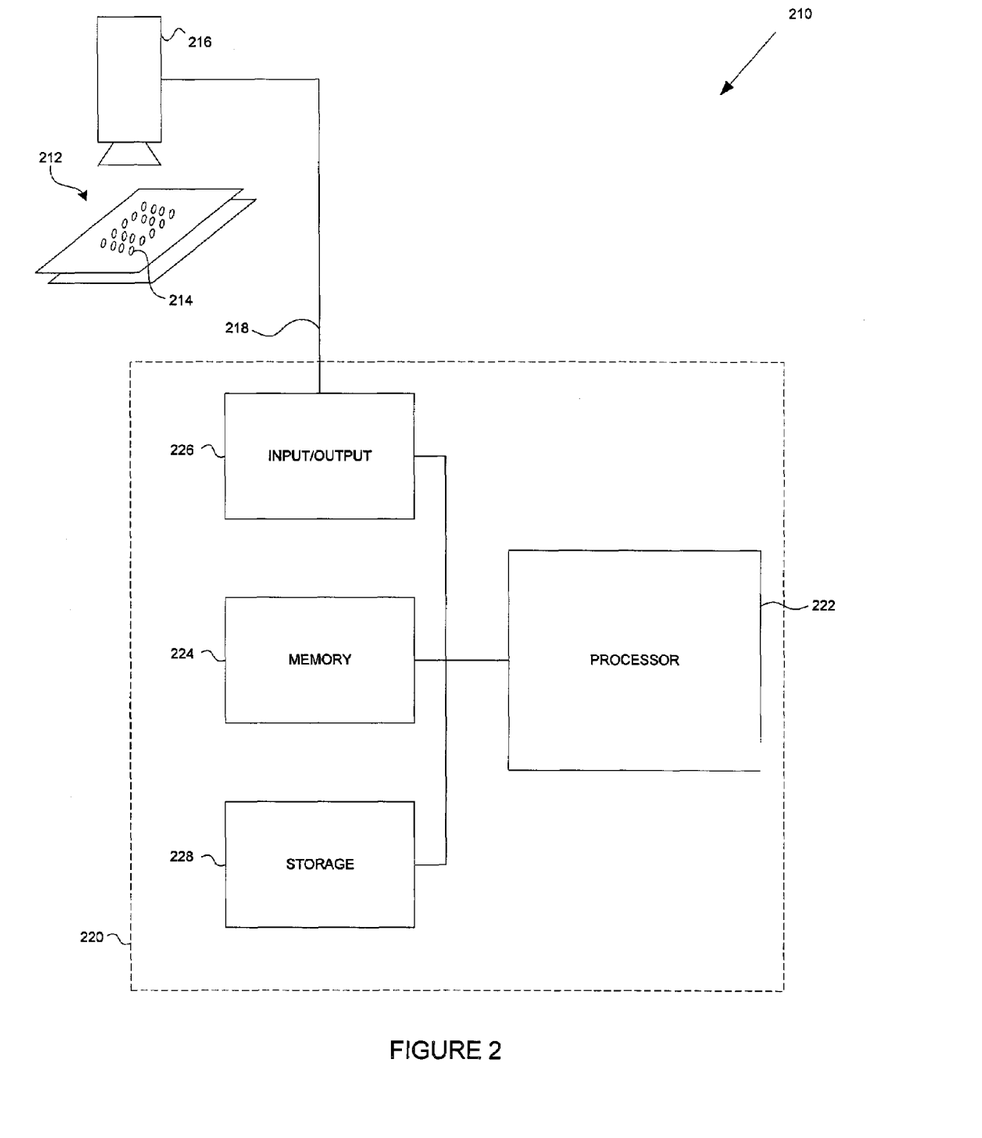
FIG. 2 depicts a machine vision system for practice of the invention.

FIG. 2 illustrates a machine system 210 of the type in which the invention is practiced. The system 210 includes a capturing device 216, such as a conventional video camera or scanner, that generates an image of an object 212 having features 214. Image data (or pixels) generated by the capturing device 216 represent, in the conventional manner, the image intensity (e.g. color or brightness) of each point in the scene at the resolution of the capturing device 216.

The capturing device 216 transmits the digital image data via a communications path 218 to an image analysis system 220. This can be a conventional digital data processor, or a vision processing system of the type commercially available, for example, from the assignee hereof, Cognex Corporation, programmed in accord with the teaching hereof to find similar features in an image from the image data and, optionally, generate a geometrical model therefrom.

The image analysis system 220 may have one or more central processing units 222, main memory 224, input-output system 226, and one or more disk drives (or other mass storage device) 228, all of the conventional type.

The system 220 and, more particularly, central processing unit 222, is configured by programming instructions according to the teachings hereof to find similar features in the image, and, optionally, generate a geometrical model, as described in further detail below. Those skilled in the art will appreciate that, in addition to implementation on a programmable digital data processor, the methods and apparatuses taught herein can be implemented in special purpose hardware.

Figure 3:
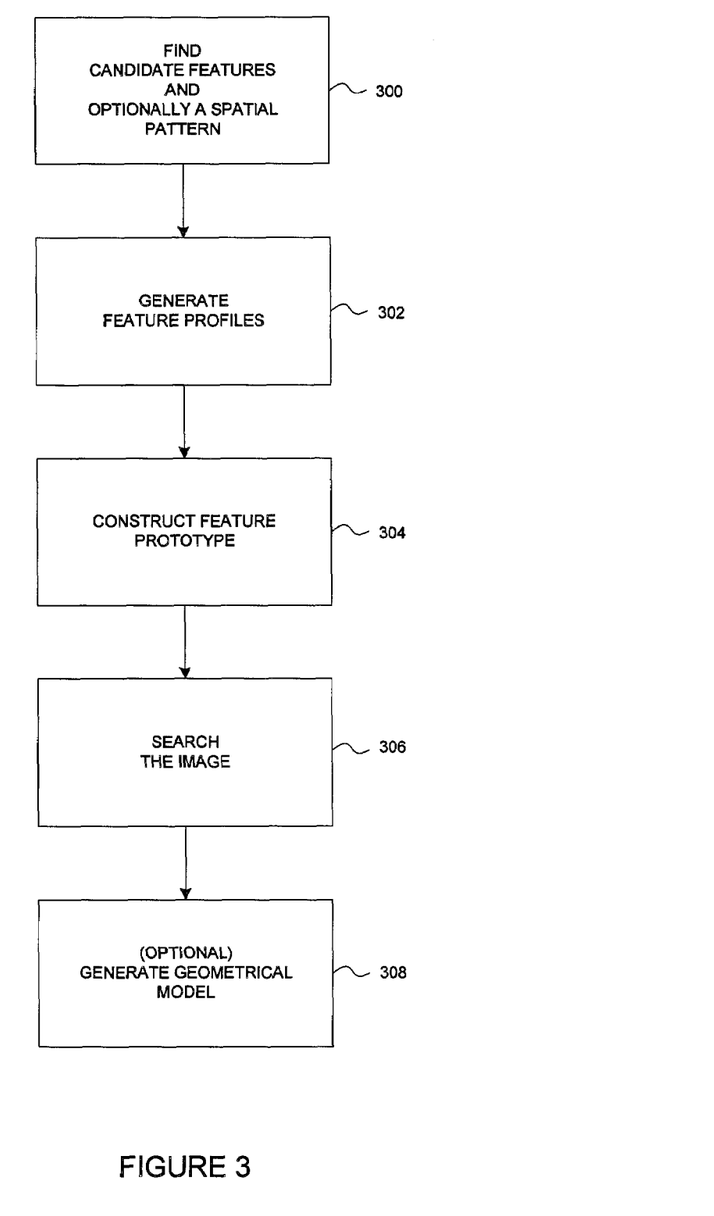
FIG. 3 is a flow chart summarizing operation of an embodiment of a method according to the invention.

FIG. 3 is a flow chart summarizing operation of an embodiment of a method according to the invention, where steps of the method are denoted in the detailed description in parentheses.

Figure 5:
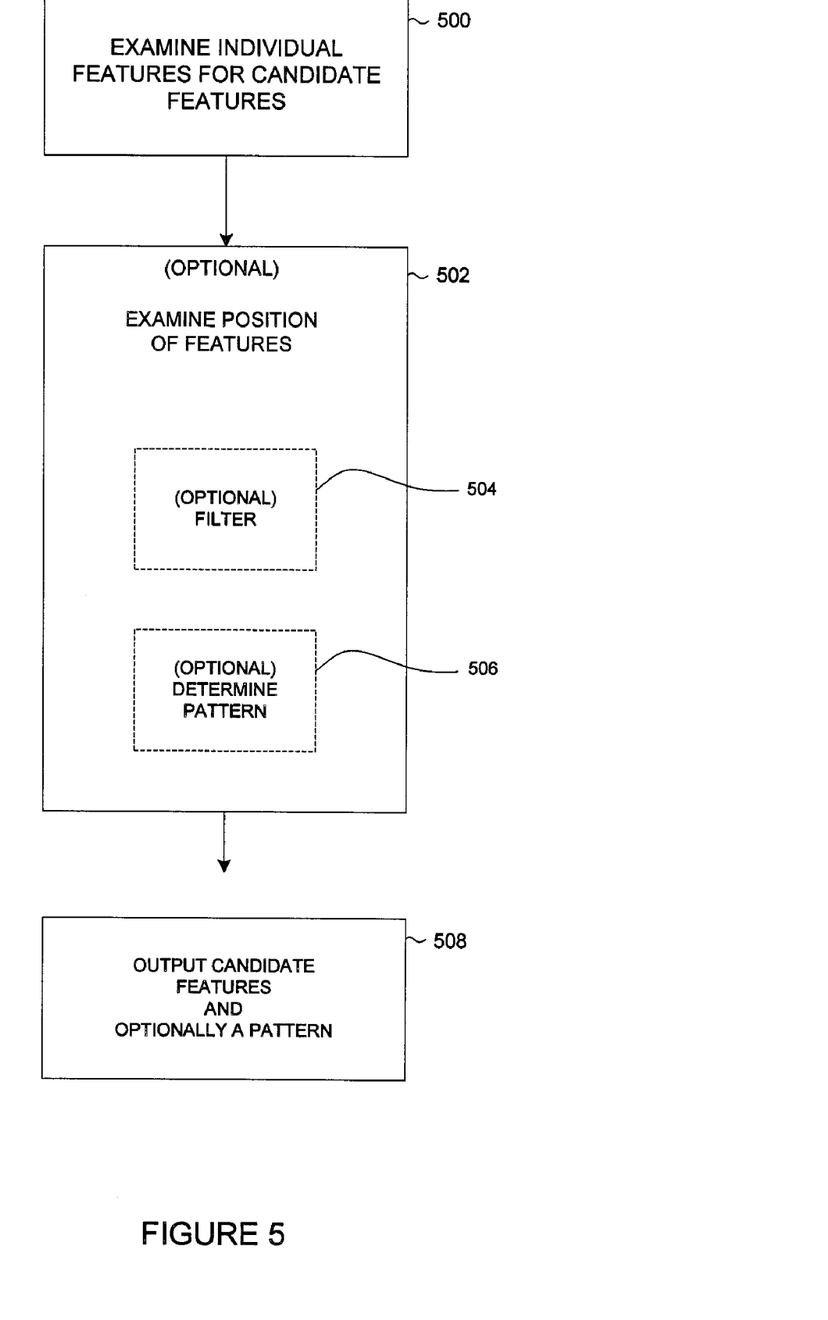
FIG. 5 is a flow chart detailing operation of an embodiment of the finding-phase of FIG. 3.

The first step is to find candidate features in the image (300) as described in more detail with reference to FIG. 5. FIG. 5 is a flowchart detailing operation of an embodiment of the finding-phase of FIG. 3, where steps of the method are denoted in the detailed description in parentheses. Candidate features are features that appear to have one or more aspects in common, such as approximate size, shape, and/or brightness, for example. Any aspect of the features can be used alone or in conjunction with others to find the candidate features (500). Many techniques known in the art can be used to find the candidate features in the image. The technique does not have to be perfect. Features that are not similar can be designated as candidate features. Further, some of the similar features can be missed, and not designated as candidate features during the finding-phase (300).

Figure 4A:
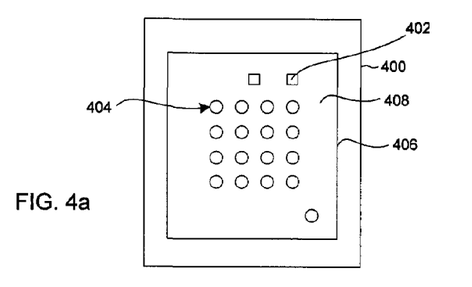
Figure 4B:
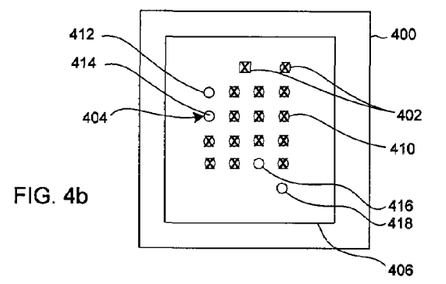
Figure 4C:
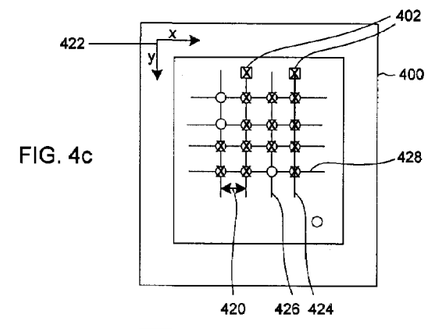

FIGS. 4a–4c depict an application of the operation of FIG. 5 applied to one instance of a ball grid array.

FIG. 4a depicts an idealized image 400 of a ball grid array 406, not drawn to scale, having an object body 408 and balls 404. The balls 404 are depicted by circles, "○". The image 400 contains other non-ball features 402, which are depicted by squares, "□". The non-ball features 402 can represent many things, including other contacts on the ball grid array, markings, or noise (in less than ideal image), for example.

The balls 404, which are solder bumps, are somewhat circular. Therefore, in one embodiment, the candidate features are identified by examining the circularity of the features in the image 400 (500). More specifically, the circularity of the balls is used to choose a good threshold value between the balls and the background, such as a grey level value in FIG. 1 between the grey level of region 104 and the background region 108.

First, the image is processed at multiple threshold values, thus, generating a plurality of results, where each result contains circular blobs and non-circular blobs. The threshold value is chosen that yielded the best result. For balls, one measure of the best result is the threshold value that yields the greatest number of circular blobs and the least number of non-circular blobs (e.g., the result wherein the number of circular blobs minus the number of non-circular blobs is maximized).

As known in the art, circularity can be tested in many ways. For example, circularity is tested by checking a blob for nearly equal moments of inertia about its principal component axes. A circular blob has nearly equal moments of inertia about its principal component axes. However, square features 402 also have nearly equal moments of inertia about their principal component axes. Therefore, using this test, both circular and square features, such as non-ball features 402, are designated candidate features. What becomes a candidate feature is made more or less stringent by choosing different tests for circularity.

One example of a set of found features is depicted in FIG. 4b. Each of the features found (i.e., candidate features) is "Xed". The candidate features include ball features, such as ball feature 410, and the non-ball square features 402. Further, some of the balls 404 were not found (i.e., not Xed), and, include ball features 412, 414, 416, and 418. Preferably, the number of missed balls is small relative to the total number of balls in the ball grid array.

What features are designated candidate features is made more stringent by using more than one aspect of the features. For instance, in addition to the circularity of the blobs, the area of the blobs is compared to upper and lower area limits to determine if the blobs possibly are solder balls. The upper and lower area limits is particular to the type of ball grid array being examined or the limits are validity limits (i.e., the largest and smallest area of solder balls on known ball grid arrays). It should be appreciated that any other test can be used in conjunction with, or instead of, the circularity test without departing from the scope of the invention.

Further, it should be apparent that applications with features that exhibit some or all of the previously enumerated lighting effects can benefit from the thresholding method described herein, with or without slight modifications, without departing from the scope of the invention. Additionally, applications whose features lack a single grey value that can be used to segment the features, such as features of various colorings, can also benefit from the thresholding method described herein, without departing from the scope of the invention.

Next, the outputted candidate features (508) are used to generate feature profiles (302).

In many applications, it is preferred that the positions of the candidate features are examined (502) before the candidate features are output (508). For instance, the positions of the candidate features are checked against norms, and candidate features are removed that deviate more than an appropriate distance from a user-supplied norm (504). Such validity testing would remove anomalies outside the object body, for example. It should be appreciated that other filtering can be performed to reduce the number of candidate features that are output.

Preferably, the positions of the candidate features are examined to determine a pattern for the candidate features (506), which is then output along with the candidate features (508). The pattern can have any shape, such as a circle or ellipse, for example, and have one or more dimensions, such as a column, for example.

For ball grid arrays, a typical pattern is a grid pattern. In a grid pattern, the balls form two sets of approximately parallel gridlines; the lines of each of the sets are positioned approximately orthogonal to the other set. The balls lie at some or all of the intersections of the gridlines. The intersections of the gridlines are sometimes referred to herein as grid points and pattern-position points. The average distance between the gridlines is the pitch 420. The pitch can be the same value or a different value for the horizontal and vertical gridlines; the pitch can also be patterned or uniform. The angle of either one of the sets of gridlines is measured relative to a coordinate system, where the gridlines 428 and 424 have a 0° and 90° grid angle, respectively, relative to the coordinate system 422.

The gridlines and the angle are determined using known grouping methods. For instance, a line-finding algorithm, such as Hough line finder, can group the candidate features by mapping the centroids of the candidate features at potential angles, and choosing as the grid angle, the angle at which more of the candidate features form lines.

Preferably, the gridlines and grid angle are determined using the methods described in commonly assigned, U.S. Pat. No. 6,075,881, incorporated herein by reference.

Using this method, an angle-finding phase and a line-finding phase are employed to find the gridlines and the grid angle. During the angle-finding phase, centroids of the candidate features are projected at multiple angles, (i.e., summed in the direction of the projection, where projection is a term known in the art and described at B. K. D. Horn, "Robot Vision," MIT Press, London England, 1985, Section 3.3 pp. 53–57) to estimate the angular orientation of a predominant line (i.e., a grid angle). In FIG. 4c, gridline 424 is an example of a predominant vertical line. Gridline 424 is predominant because more candidate features fall on gridline 424 than any other vertical gridline in the image 400. Gridline 424 has a grid angle of 90°. The grid angle is used by the line finding-phase to find the gridlines by identifying sets of centroids aligned with the grid angle, such as gridline 426, as well as identifying gridlines 90° from the grid angle, such as gridline 428. More particularly, the centroids of the candidate features are projected at the grid angle and at 90° plus the grid angle, and the gridlines are located at peaks in the projections, as is further described in the above referenced patent application.

Not all of the candidate-features must appear on the gridlines.

Variations and enhancements to the method of finding the grid angle and the gridlines are described in the above referenced patent application.

Optionally, the gridlines are further refined by matching centroids of the candidate features with the grid points (i.e., matching centroids within a distance tolerance of an intersection of the gridlines with the respective intersection), and then performing a least squares fit to the positions of the centroids in each grouping (i.e., gridlines) of candidate features, thereby generating refined gridlines.

Once the grid angle and the gridlines are determined, the pitch (i.e., the average spacing between the gridlines) and the pattern-position points (i.e., the intersections of the gridlines) are easily determined FIG. 4c depicts an example of the gridlines found for the image 400. The specifics of the groupings of the candidate features can vary according to the application. For instance, the groupings of FIG. 4c do not include lines that have two or less candidate features. If FIG. 4c included these less dense lines, FIG. 4c would include a horizontal line formed by the two non-ball features 402.

It should be apparent that a user can supply information about the pattern instead of, or in addition to, determining the information from the image. For instance, user-supplied magnification values and pitch value(s) can focus the search for candidate features.

It should also be apparent that a grid pattern or any pattern of the candidate features can be determined using techniques, not enumerated herein, without departing from the scope of the invention.

Generating a pattern (506) is optional, and not desired and/or necessary in all applications. For example, balls on flip chips often have no regular pattern, and thus, flip chip applications will not benefit from this step (506), where a flip chip is a type of surface mount device. Further, it is not necessary to use a pattern even for objects with patterns, such as the ball grid array described herein.

Patterns, however, indicate the more likely places to find candidate features; and therefore, indicate the probability that the found candidate features are correct.

Next, feature profiles are generated from the candidate features (302).

A feature profile represents a candidate feature. The feature profile can be a local image or a set of statistics gathered from the image at the approximate position of the candidate feature, for example. The adequacy of a particular representation by the feature profile depends on the application.

In a preferred embodiment, each feature profile is a local sub-image of the candidate feature and the neighborhood of that candidate feature, where a neighborhood of the candidate feature includes the candidate feature and the background near the candidate feature. The local sub-image is extracted from the image preferably during the finding-phase (300).

A feature prototype is then constructed using at least a subset of the feature profiles (304). Preferably, the feature prototype is an average image of the local feature profile images. An average image is created by aligning the local images on top of each other, to create aligned images; and assigning as the pixel value in the average image, the average of the pixel values at each corresponding pixel location in the aligned local images.

Methods other than averaging can be used to construct the feature prototype, such as taking the mean or median of the sub-images, of regions within the sub-images, or of each pixel within the sub-images. Any method that produces a feature prototype that represents the majority of the feature profiles is sufficient.

Non-ball features, such as non-ball features 402, empty regions (not shown), or noise (not shown), for example, that were designated candidate features are used to generate the feature prototype. However, these regions are typically small in number compared to the number of actual ball features.

Figure 4D:
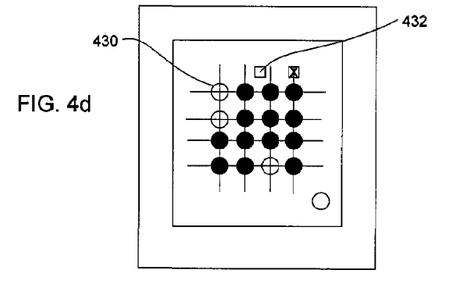
Figure 4E:
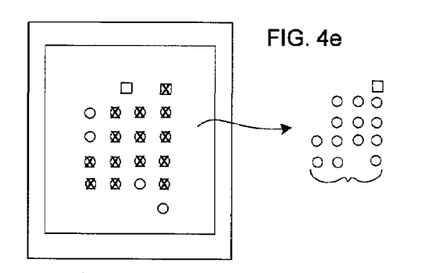
Figure 4F:
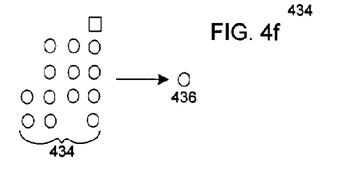

Preferably, only the "best" candidate features are used to construct the feature prototype. The "best" candidate features are the candidate features that are positioned near the grid points of the pattern. The candidate features that are opaque, (i.e., either ● or ■ in FIG. 4d depict the best candidate features from among the Xed candidate features of FIG. 4c. The non-ball feature 432 is not one of the best candidate features because it does not fall near a grid point 430. Thus, the non-ball feature 432 is not used to generate the feature prototype. FIGS. 4e–4f depict an example of the best feature profiles that are extracted 434 from the image 400 to generate a feature prototype 436.

It should be apparent that a subset of the feature profiles can be used to generate the feature prototype to decrease processing time or memory requirements.

It should also be apparent that the nature of, and generation of, the feature prototype depends upon the nature of the feature profiles. Particularly, for feature profiles other than sub-images, other techniques, not enumerated herein, can be used without departing from the scope of the invention.

Next, the image is searched (306) for features that are substantially similar to the feature prototype. One way to perform this step is to train a search model of the feature prototype, and then search the image for features that substantially match the search model within a given tolerance, (e.g., a range of correlation scores). Training a model and searching an image for a match to the model are techniques known in the art.

The tolerance is application dependent. For instance, a greater tolerance (i.e., matches that are not so close) should be used if the feature prototype was generated using feature profiles other than only the best feature profiles. A greater tolerance could help compensate for including more non-ball features when generating the feature prototype.

Instead of, or in addition to, matching a feature image to a model of the feature prototype, the search (306) can compare aspects of the features to aspects of the prototype to determine if the features are substantially similar to the feature prototype within a tolerance. The application will dictate the more appropriate search. If, for example, the prototype were the mean grey scale of the feature, the search (306) would compute the mean grey scale of the portions of the image and compare the statistics, i.e. the prototype with the mean scale of each of the portions of the image.

Figure 4G:
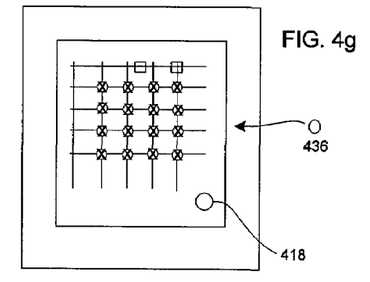

In a preferred embodiment, the extent of the search (306) is focused by the earlier determined pattern. Specifically, the image is searched only in the neighborhoods of the grid points. FIG. 4g depicts an instance of a grid pattern superimposed over the image, and the Xed features depict the features found that match the feature prototype 436.

Figure 7:
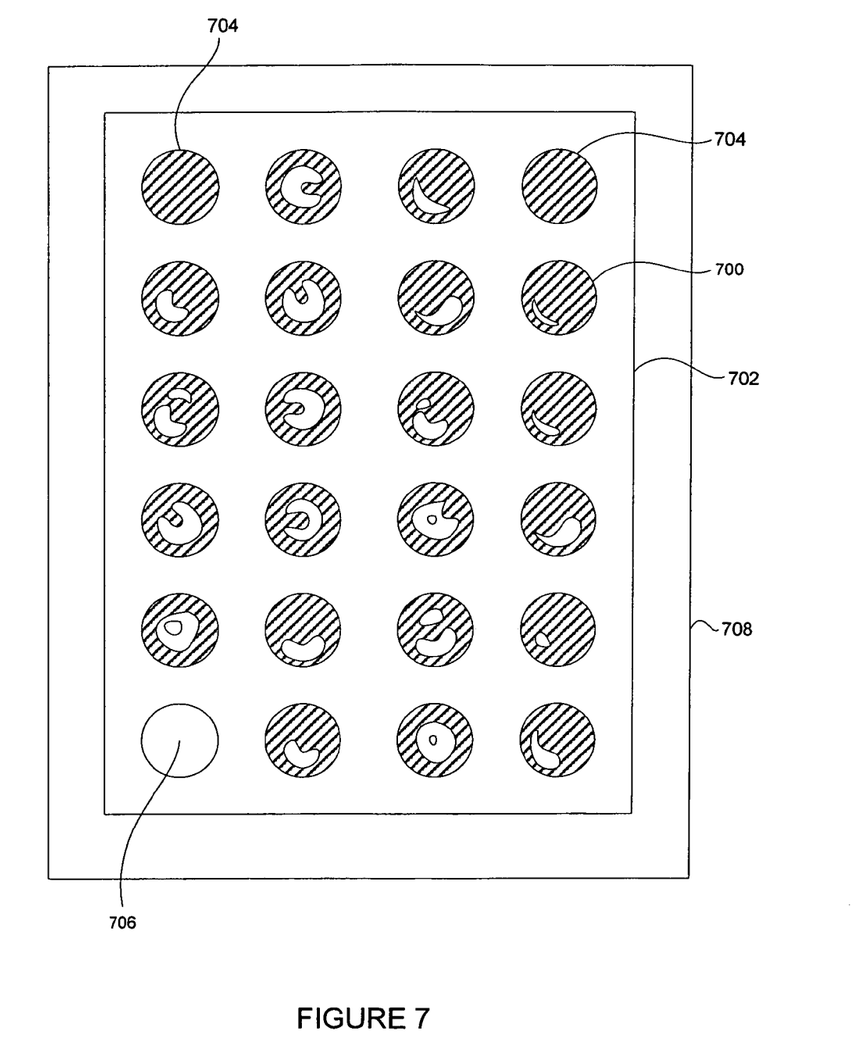
FIG. 7 depicts an instance of a binarized image of a ball grid array.

FIG. 7 depicts another example of similar features found by the invention, which depicts an instance, not drawn to scale, of a binarized image of specularly reflecting balls 700 of a ball grid array 702. The balls 700 image differently because of lighting effects as previously described, and, thus, appear different in the image 708. However, one embodiment of the invention designates the balls 700 as similar features in the image 708. The balls 700 are similar, even though they are different. At the same time, the white circle 706, although it has the same shape as the balls 700, is not designated as a similar feature to the balls 700. The black circles 704, although they exhibit the same shape and polarity as the balls 700, are also not designated as similar features to the balls. It should be apparent that the extent of similarity of the features found by the invention can vary without departing from the scope of the invention. Further, that the extent of similarity can be tailored to the application by changing the amount of, or type of, similarity required, such as allowing squares and circles to be similar features, but not squares or circles having more than n regions, for example.

Figure 4H:
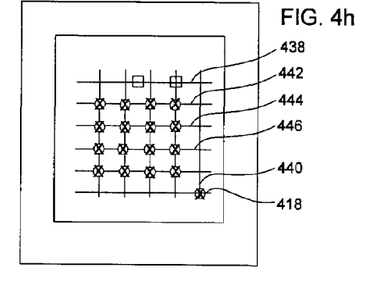

Ball grid arrays and other patterns often have balls or features, such as feature 418, displaced from the majority of the other features. The displaced feature can indicate the origin or proper orientation of the ball grid array, for example. To find the displaced feature(s), the pattern is extended, as shown in FIG. 4h, by one or more gridlines, such as gridlines 438 and 440, in both the horizontal and vertical directions to generate additional grid points, such as grid points 442, 444, and 446, about which a search for features is conducted.

Any other pattern, such as columns, can be extended in this manner to find additional features that match the feature prototype.

Lastly, the locations of each of the features that match the prototype are optionally used to generate a geometrical model of the object (308). Preferably, other information about the features, such as ball radius, is included in the model. The other information, such as ball radius, is computed from the features that matched the prototype. The blob analysis conducted during the finding-phase is one source for the additional data about the features that is incorporated into the model. Also, the dimensions of each of the balls are measured using other tools, such as calipers, for example.

Figure 4I:
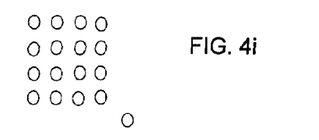

A typical model of a ball grid array includes the pitch in the two dimensions (such as x and y); a nominal, a minimum, and a maximum dimension of the balls in the grid; the presence or absence of balls at each of the grid points; and an origin location. An example of a model image for the ball grid array of FIG. 4 is shown in FIG. 4*i*.

Figure 6:
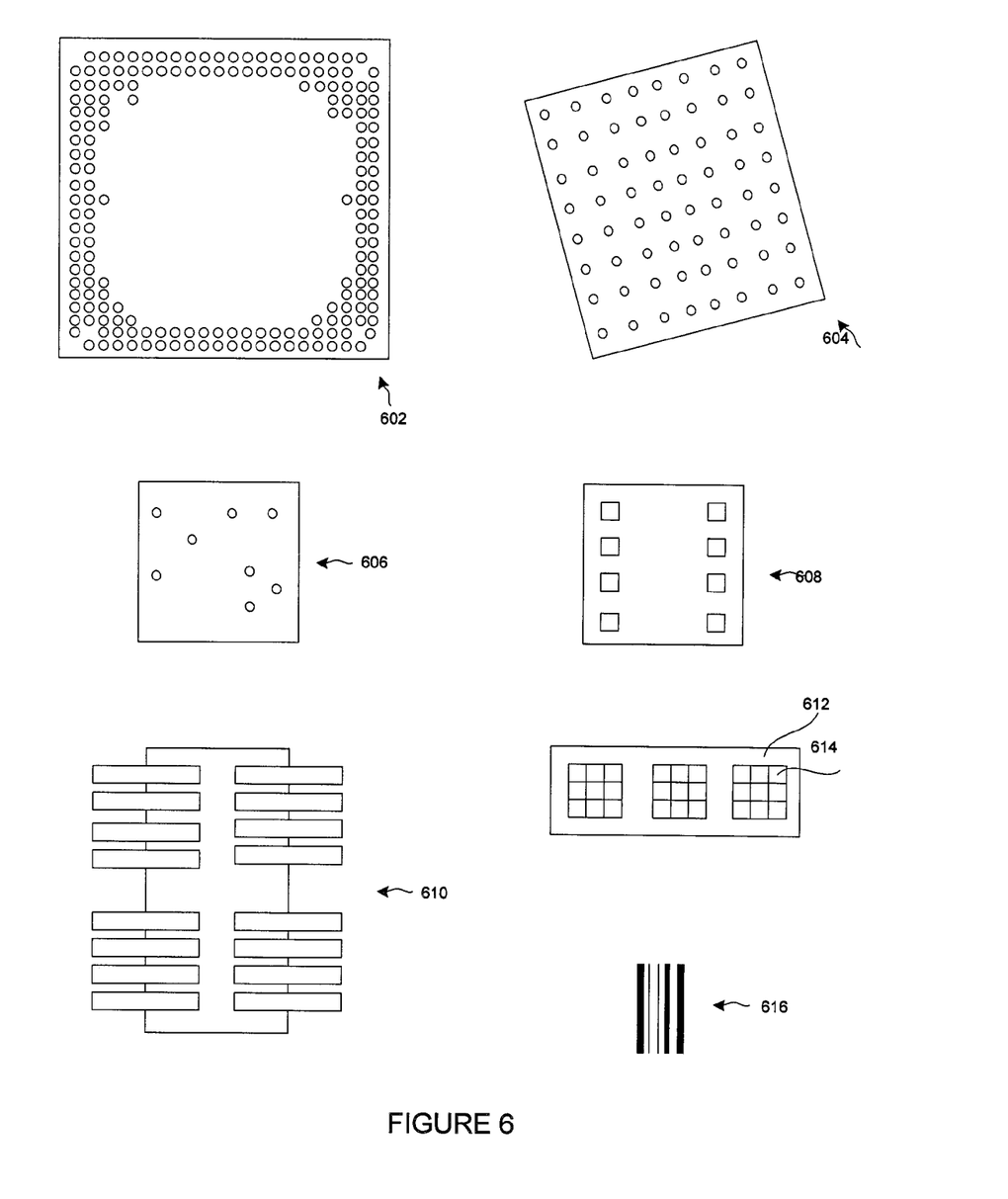
FIG. 6 depicts other objects whose features can be found and, optionally, modeled using the method of the invention.

FIG. 6 depicts examples of other features that can be found, and optionally modeled, using the method of the invention, including other ball grid arrays 602 and 604, solder balls on flip chips 606, pads on integrated circuits 608, leads of other surface mount devices 610, liquid crystal display groupings or light emitting diodes groupings 612, or the elements 614 within liquid crystal display groupings or light emitting diodes groupings, and bar codes 616, for example. When the features being compared are suppose to vary, such as the different width leads of the leaded object 610, the feature prototype is scaled when compared to each feature position if the feature prototype is an image, or the feature prototype excludes the varying aspect and is a statistical description of length and spacing between features, for example. Likewise, for a bar code 616, the prototype can consist of length and not width if each line of the bar code is being verified.

Those skilled in the art will appreciate that some, or all, of the steps of finding the candidate features, finding a pattern, generating feature profiles, constructing a feature prototype, searching an image, and generating models described hereinbefore can be combined and effected as hardware implementations, software implementations or a combination thereof.

It should be further appreciated with respect to the foregoing, that it is not necessary to generate a feature prototype before examining features in successive objects and that a database of information can be stored and accessed to obtain the feature prototype information after the prototype information has been generated once for that type of object. The database of information can be from a captured image, downloaded from a Computer Aided Design tool, or otherwise acquired. Likewise, pattern information can be stored and used later in the same manner.

While the system described herein acquires and stores an entire image and sometimes sub-images, it will be appreciated that instead of storing an entire image or sub-images useful information about the image and sub-images, such as histograms, can be stored and used to synthesize an image or sub-images when needed.

Furthermore, while other operations described herein use an image and its sub-images, it should be appreciated that any of the images described herein can be subject to further processing, such as by filtering using a gaussian filter, median filter, smoothing filter, morphological filter or the like known in the art, in order to improve image quality.

Although a training process is described herein using blob analysis for finding candidate features and obtaining characteristics relating to the features, it should be appreciated that information relating to the features can be obtained using other vision tools, including an edge detection tool, such as the Cognex Caliper Tool, a CAD tool, or other machinery that requires, or acquires, and has information relating to the characteristics of interest, for example.

Furthermore, the invention can be used during training, to build a model for example, and/or during run-time, to inspect the object for the presence of features or characteristics of the features, for example. Furthermore, although a single object is described, those skilled in the art will realize that an object can be analyzed over a sequence of process steps, or over time. Depending on the requirements of the training or inspection completed by the method, the feature prototype could be continually updated and the latest feature prototype matched against an earlier feature instance or the initial feature instance.

Those skilled in the art will also realize that using reduced-resolution images to find the candidate features, generate the pattern, and/or generate the feature profiles, for example, could decrease processing time. Further, any combination of full-resolution and reduced-resolution images can be used.

Those skilled in the art will realize that processing time can also be decreased by performing any of the computations described herein using less than the available data, such as, generating feature profiles of a subset of the candidate features, using a subset of the feature profiles to generate the feature prototype, determining the grouping of the features from a subset of the features, such as every third feature, for instance, and determining statistical information about a subset of the features, for example.

It should also be apparent that the speed of the application can be enhanced using user-supplied information as an initial starting point for a feature or part of the pattern, for example. For instance, the diameter of the balls can be supplied as a starting point that increases the speed of finding of the candidate features.

Those skilled in the art will realize that the features do not have to be part of one object but can be in separate objects.

Other modifications and implementations will occur to those skilled in the art without departing from the spirit and the scope of the invention as claimed. Accordingly, the above description is not intended to limit the invention except as indicated in the following claims.

What is claimed is:

1. A method for finding features that are similar within an image comprising:
   finding candidate features within the image;
   generating feature profiles of the candidate features;
   constructing a feature prototype using at least a subset of the feature profiles; and
   searching portions of the image for features that are substantially similar to the feature prototype.

2. The method of claim 1, further comprising:
   determining a spatial pattern within the image before searching portions of the image, the spatial pattern being formed by a majority of the candidate features, the spatial pattern providing pattern-position points in the image, and each of the pattern-position points being within the spatial pattern;
   wherein searching further includes:
   searching the portions of the image that are neighborhoods of the pattern-position points.

3. The method of claim 2, wherein determining the spatial pattern further includes:
   grouping at least a portion of the candidate features into first sets of approximately collinear candidate features, each of the first sets representing a first line, the first lines being substantially parallel to one another;

grouping at least a portion of the candidate features into second sets of approximately collinear candidate features, each of the second sets representing a second line, the second lines being substantially parallel to one another and substantially orthogonal to the first lines; and determining the spatial pattern formed by the first lines and the second lines, the pattern-position points being at intersections of the first lines and second lines.

4. The method of claim 3, wherein the spatial pattern includes an origin and an angle of, and a pitch between, at least one of the first lines and second lines.

5. The method of claim 3, wherein the spatial pattern includes an angle of and a pitch between, at least one of the first lines and second lines.

6. The method of claim 2, wherein searching further includes:

training a search model for the feature prototype; and searching the neighborhoods of the pattern-position points for features that substantially match the search model.

7. The method of claim 1, wherein searching further includes:

comparing feature-aspects of the features to prototype-aspects of the feature prototype to verify whether at least one the feature-aspects substantially matches one of the prototype-aspects.

8. The method of claim 1, further comprising a run-time phase, where the run-time phase includes:

acquiring a run-time image having run-time features;

generating run-time feature profiles for the run-time features; and comparing the run-time feature profiles to the feature prototype to verify whether each of the run-time features, represented by the run-time feature profiles, substantially conforms to the feature prototype.

9. The method of claim 1, wherein finding the candidate features further includes:

thresholding the image at multiple thresholds so as to produce a set of candidate features at each of the multiple thresholds; and using as the candidate features, the candidate features of one of the sets that has more candidate features that are circular.

10. The method of claim 9, wherein the features that are similar are solder balls.

11. The method of claim 1, wherein finding the candidate features further includes:

thresholding the image at multiple thresholds so as to produce a set of candidate features at each of the multiple thresholds; and using as the candidate features, the candidate features of one of the sets that has more candidate features that share approximately a same shape.

12. The method of claim 1, wherein finding the candidate features further includes:

examining features in the image for a feature aspect; and designating features having the feature aspect as the candidate features.

13. The method of claim 12, wherein the feature aspect includes a characteristic of a solder ball.

14. The method of claim 12, wherein the feature aspect includes shape.

15. The method of claim 12, wherein the feature aspect includes brightness level.

16. The method of claim 12, wherein the feature aspect includes size.

17. The method of claim 1, wherein finding the candidate features further includes:

extracting the candidate features from the image.

18. The method of claim 1, wherein the features that are similar are solder balls.

19. The method of claim 1, wherein generating the feature profiles further includes:

generating sub-images as the feature profiles, each of the sub-images including one of the candidate features and respective neighboring image background;

wherein constructing the feature prototype further includes:

averaging the at least a subset of the sub-images so as to produce the feature prototype.

20. The method of claim 1, wherein generating the feature profiles further includes:

generating statistics representing each of the candidate features to provide the feature profiles.

21. The method of claim 1, wherein constructing the feature prototype further includes:

constructing the feature prototype that represents a majority of the at least a subset of feature profiles.

22. The method of claim 1, further comprising:

determining a spatial pattern within the image formed by a majority of the candidate features, the spatial pattern providing pattern-position points in the image, the pattern-position points being within the spatial pattern;

wherein constructing the feature prototype further includes:

constructing the feature prototype using as the subset of feature profiles ones of the feature profiles representing candidate features positioned near the pattern-position points given by the spatial pattern.

23. The method of claim 1, wherein searching further includes:

training a search model for the feature prototype; and searching portions of the image for features that substantially match the search model.

24. The method of claim 1, wherein searching further includes:

searching the portions of the image that are neighborhoods of the candidate features.

25. The method of claim 1, wherein searching further includes:

searching portions of the image for features that are substantially similar to the feature prototype to a predetermined extent.

26. A method for finding features of a specified-feature type within an image:

finding candidate features within the image;

generating feature profiles from the candidate features;

constructing a feature prototype of the specified-feature type using at least a subset of the feature profiles; and comparing portions of the image to the feature prototype to verify whether any of the portions of the image contain one of the features of the specified-feature type.

27. The method of claim 26, wherein the specified-feature type is a ball of a certain size.

28. The method of claim 26, wherein the specified-feature type includes a characteristic of a solder ball.

29. The method of claim 26, wherein the specified-feature type includes a shape.

30. The method of claim 26, wherein the specified-feature type includes a characteristic of a solder ball and wherein finding the candidate features further includes:

thresholding the image at multiple thresholds so as to produce a set of candidate features at each of the multiple thresholds; and using as the candidate features, the candidate features of one of the sets that has more candidate features that are circular.

31. The method of claim 26, further comprising:

determining a spatial pattern within the image before comparing, the spatial pattern being formed by a majority of the candidate features, the spatial pattern providing pattern-position points in the image, and each of the pattern-position points being within the spatial pattern;

wherein comparing further includes:

comparing the portions of the image that are neighborhoods of the pattern-position points.

32. The method of claim 31, wherein determining the spatial pattern further includes:

grouping at least a portion of the candidate features into first sets of approximately collinear candidate features, each of the first sets representing a first line, the first lines being substantially parallel to one another;

grouping at least a portion of the candidate features into second sets of approximately collinear candidate features, each of the second sets representing a second line, the second lines being substantially parallel to one another and substantially orthogonal to the first lines; and determining the spatial pattern formed by the first lines and the second lines, the pattern-position points being at intersections of the first lines and second lines.

33. The method of claim 32, wherein the spatial pattern includes an origin and an angle of and a pitch between, at least one of the first lines and second lines.

34. An apparatus for finding similar features within an image:

finding means adapted to find candidate features within the image;

profile means, in cooperation with the finding means, adapted to generate feature profiles from the candidate features;

prototype means, in cooperation with the profile means, adapted to construct a feature prototype using at least a subset of the feature profiles; and search means, in cooperation with the prototype means, adapted to search portions of the image for features that are substantially similar to the feature prototype.

35. The apparatus of claim 34, wherein the finding means further includes:

thresholding means adapted to threshold the image at multiple thresholds so as to produce a set of candidate features at each of the multiple thresholds; and choosing means, in cooperation with the thresholding means, adapted to use as the candidate features, the candidate features of one of the sets that has more candidate features that are circular.

36. The apparatus of claim 34, wherein the finding means further includes:

thresholding means adapted to threshold the image at multiple thresholds so as to produce a set of candidate features at each of the multiple thresholds; and choosing means, in cooperation with the thresholding means, adapted to use as the candidate features, the candidate features of one of the sets that has more candidate features that share approximately a same shape.

37. The apparatus of claim 34, wherein finding means further includes:

examining means adapted to examine features in the image for a feature aspect; and designating means, in cooperation with the examining means, adapted to designate features having the feature aspect as the candidate features.

38. The apparatus of claim 34, further comprising:

pattern means, in cooperation with finding means and the search means, adapted to determine a spatial pattern within the image, the spatial pattern being formed by a majority of the candidate features, the spatial pattern providing pattern-position points in the image, and each of the pattern-position points being within the spatial pattern;

wherein the search means is further adapted to search the portions of the image that are neighborhoods of the pattern-position points.

39. The apparatus of claim 38, wherein the pattern means further includes:

first grouping means, in cooperation with the finding means, adapted to group at least a portion of the candidate features into first sets of approximately collinear candidate features, each of the first sets representing a first line, the first lines being substantially parallel to one another;

second grouping means, in cooperation with the finding means, adapted to group at least a portion of the candidate features into second sets of approximately collinear candidate features, each of the second sets representing a second line, the second lines being substantially parallel to one another and substantially orthogonal to the first lines;

wherein the pattern means is adapted to determine the spatial pattern formed by the first lines and the second lines, the pattern-position points being at intersections of the first lines and second lines.

40. The apparatus of claim 39, wherein the spatial pattern includes an angle of, and a pitch between, at least one of the first lines and second lines.

41. The apparatus of claim 34, wherein the prototype means is further adapted to construct the feature prototype of a specified-feature type.

42. The apparatus of claim 41, wherein the specified feature type includes a characteristic of a solder ball.

43. The apparatus of claim 41, wherein the specified-feature type includes a shape.

44. The apparatus of claim 34, wherein the search means is further adapted to search portions of the image for features that are substantially similar to the feature prototype to a predetermined extent.

* * * * *